United States Patent [19]

Waschkuttis

[11] 4,276,864
[45] Jul. 7, 1981

[54] FUEL-VAPORIZING SYSTEM FOR INTERNAL-COMBUSTION ENGINE AND METHOD OF OPERATING SAME

[76] Inventor: Gerhard Waschkuttis, 19800 NE. 14th Ave., North Miami Beach, Fla. 33179

[21] Appl. No.: 10,993

[22] Filed: Feb. 9, 1979

[51] Int. Cl.³ .............................................. F02M 31/00
[52] U.S. Cl. ................................. 123/544; 123/549; 123/557
[58] Field of Search ............. 123/122 E, 122 M, 133, 123/127, 121, 122 F, 122 AC, 122 D, 27 GE, 544, 557, 549, 576, 577, 578; 261/DIG. 20, 142

[56] References Cited

U.S. PATENT DOCUMENTS

| | | | |
|---|---|---|---|
| 1,002,025 | 8/1911 | Berry | 123/133 |
| 1,106,881 | 8/1914 | Maruyama | 123/133 |
| 1,366,242 | 1/1921 | Caldwell | 123/133 |
| 1,377,529 | 5/1921 | Trotter | 123/544 |
| 1,559,214 | 10/1925 | Woolson | 123/3 |
| 1,776,871 | 9/1930 | Thurber | 123/544 |
| 1,980,496 | 11/1934 | Musselwhite | 123/133 |
| 2,115,634 | 4/1938 | Kiesel | 123/127 |
| 2,464,047 | 3/1949 | Zarkin | 261/DIG. 20 |
| 3,022,425 | 2/1962 | Rockstead | 123/127 |
| 3,057,606 | 10/1962 | Hegna | 261/DIG. 20 |
| 3,625,190 | 12/1971 | Boissevain | 123/122 F |
| 3,850,152 | 11/1974 | Hollins | 123/122 D |
| 4,020,812 | 5/1977 | Hayward | 123/122 F |
| 4,020,815 | 5/1977 | Hubert | 123/122 D |

FOREIGN PATENT DOCUMENTS 826089 7/1949 Fed. Rep. of Germany ...... 123/122 D

*Primary Examiner*—Ronald H. Lazarus
*Attorney, Agent, or Firm*—Karl F. Ross

[57] ABSTRACT

A carburetor communicating with an intake manifold of an internal-combustion engine receives preheated air through an annular filter heated electrically during a cold-starting phase and fluidically with the engine in operating condition, the air passing around a flap valve—acting as an automatic choke—into a mixing chamber to aspirate a volatile hydrocarbon such as gasoline from a main fuel tank. The flap valve is heated in the same manner as the filter, and so are a pair of accelerator-controlled throttle valves separating the mixing chamber from a further compartment into which a heavier hydrocarbon such as diesel oil is aspirated in vaporized form after passing from an ancillary fuel tank through a boiling cylinder heated by the exhaust gases of the engine. The fuel/air mixture enriched with the diesel-oil vapors enters the intake manifold where any residual droplets are intercepted by a stationary plate which is also heated and, like the throttle valves, is coated with an adsorbent layer of metal gauze or wicking to promote evaporation. The boiling cylinder, located in the exhaust duct or a branch thereof, may be journaled for rotation by the exhaust gases or may have a recirculating conduit including a pump driven by these gases for preventing the accumulation of liquid hydrocarbons therein.

21 Claims, 11 Drawing Figures

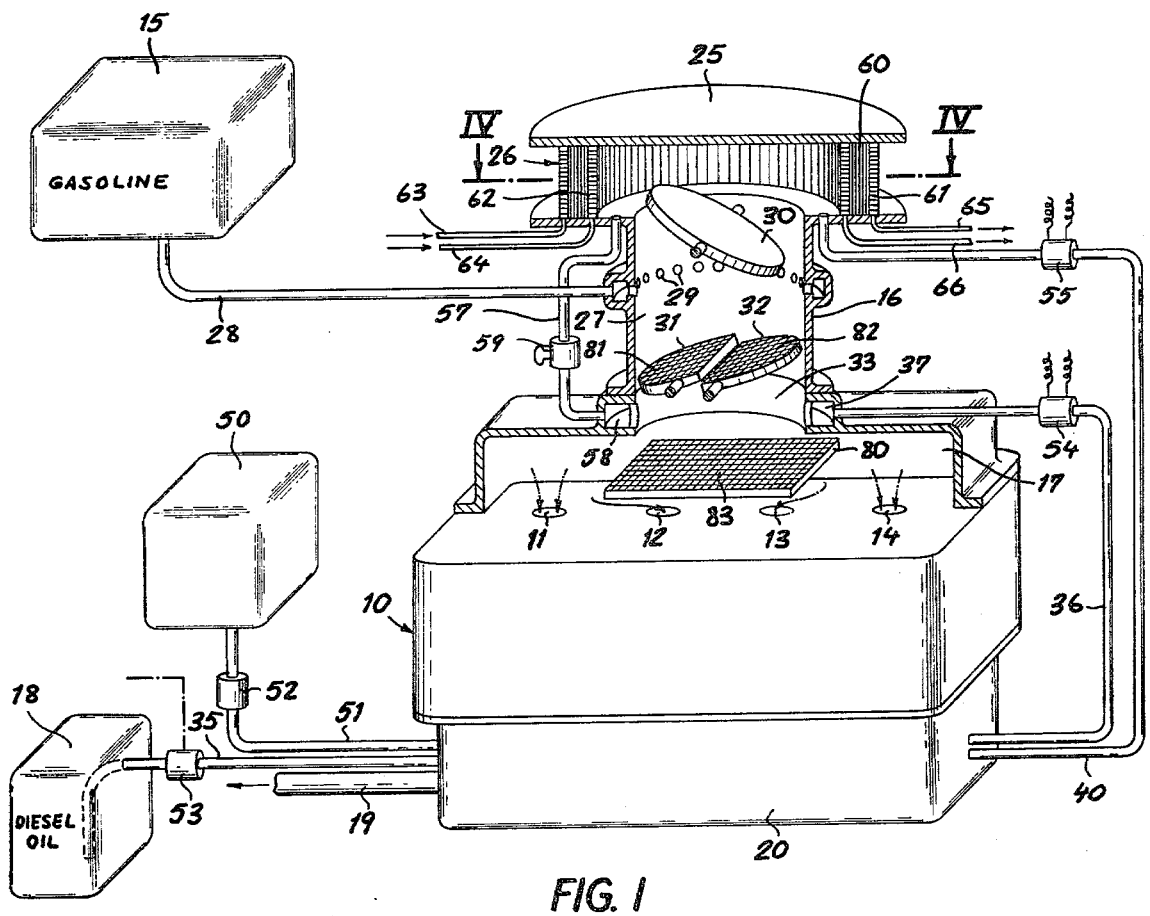
FIG. 1
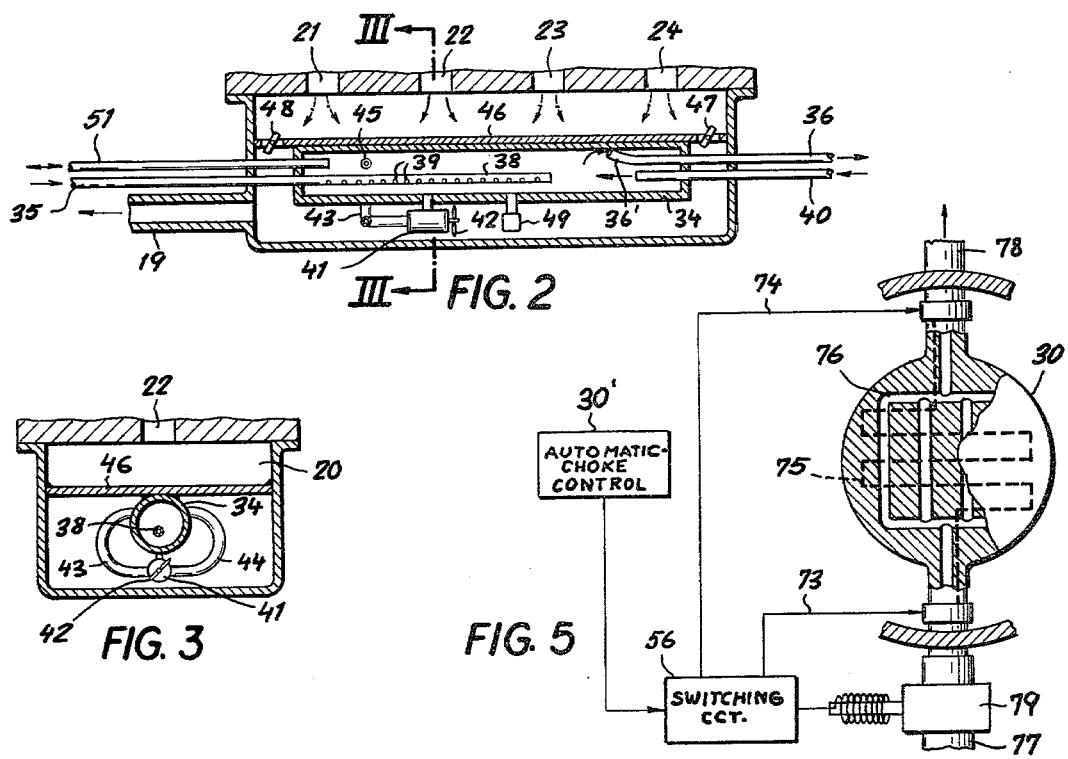
FIG. 2
FIG. 3
FIG. 5

FUEL-VAPORIZING SYSTEM FOR INTERNAL-COMBUSTION ENGINE AND METHOD OF OPERATING SAME

FIELD OF THE INVENTION

My present invention relates to a method of operating an internal-combustion engine and to an improved fuel-vaporizing system used with such an engine.

BACKGROUND OF THE INVENTION

For an efficient operation of an internal-combustion engine running on gasoline or other liquid hydrocarbons it is necessary to insure a substantially complete gasification of the fuel which is drawn, in intimate admixture with atmospheric air, into the combustion cylinders of the engine for ignition therein. In many instances, especially with heavier hydrocarbons such as diesel oil, preheating of the fuel to a temperature near or above its boiling point has been found advantageous. It has also been proposed to use the waste heat of the engine for this purpose by letting the fuel pass in heat-exchanging relationship with the exhaust gases to the carburetor in which it is admixed with the air aspirated by the pistons of the engine.

Except in the case of diesel engines, in which the oil is injected at high temperature and pressure into the piston cylinders for spontaneous ignition therein, the use of medium-weight and heavy hydrocarbons in internal-combustion engines has up to now been rather limited despite the aforementioned teachings of the art. This, I believe, is mainly due to the difficulty of obtaining a thorough vaporization of these less volatile hydrocarbons. Thus, the usual boiling chambers heated by exhaust gases retain a significant proportion of the incoming fuel in liquid form on the chamber bottom, at least part of this liquid eventually finding its way into the lubricating system of the engine and being therefore lost to the power-generating process.

OBJECTS OF THE INVENTION

A more extensive utilization of heavier hydrocarbons such as crude oil, which are generally cheaper than the lighter constituents such as gasoline obtained by fractional distillation, would be economically advantageous if the efficiency of engines adapted for their use could be significantly improved. An important object of my invention, therefore, is to provide means for increasing the power yield of such heavier hydrocarbons in an internal-combustion engine.

A related object is to provide a method of more economically operating such an engine or an automotive vehicle equipped therewith.

It is also an object of my invention to provide means for effectively vaporizing, in a substantially residue-free manner, a liquid fuel used to power an internal-combustion engine.

SUMMARY OF THE INVENTION

I have found, in accordance with my present invention, that the efficiency of an internal-combustion engine (e.g. as measured in miles per gallon or kilometers per liter in the case of an automotive vehicle) can be substantially improved if the air admitted to the intake manifold of the engine is preheated before passing through a mixing chamber into which vapors of a relatively light hydrocarbon are aspirated by the air stream and if the resulting air/fuel mixture is enriched by the admixture of a relatively heavy hydrocarbon which has been vaporized by heat exchange with the combustion gases traversing the exhaust manifold.

For simplicity's sake, I shall refer hereinafter to the light hydrocarbon as gasoline and to the heavy hydrocarbon as diesel oil even though I may also use methyl or ethyl alcohol, kerosene, heating oil or other petroleum fractions.

Pursuant to a more particular feature of my invention, a considerable increase in mileage can be achieved if the light and heavy hydrocarbons are admitted to the intake manifold, in terms of liquid volume, in a ratio ranging between substantially 10:1 and 2:1. Though larger proportions of diesel oil are also satisfactory, the improvement in efficiency becomes marginal when the injection rate of the diesel oil equals or exceeds that of the gasoline.

In accordance with another aspect of my invention, the gasoline and the diesel oil are stored in a main fuel tank and in an ancillary tank, respectively, from which the gasoline is fed via a second conduit means to a downstream location of the carburetor forming the aforementioned mixing chamber. A boiling chamber included in the second conduit means is positioned in heat-exchanging relationship with the combustion gases passing through the exhaust manifold of the engine.

Advantageously, the first conduit means opens directly into the mixing chamber whereas the second conduit means opens into a space defined by the entrance of the intake manifold and a throttle valve (which may be formed from one or several valve bodies) separating that entrance from the mixing chamber. In order to preheat the air entering the mixing chamber through the carburetor inlet, I prefer to provide that inlet with an air filter equipped with heating means. Similar heating means may be provided on the throttle valve itself as well as on a flap valve which is disposed between the air filter and the mixing chamber to serve as an automatic choke designed to restrict the air inflow in a start-up phase when the engine is cold; the feed of diesel oil from the ancillary tank may be blocked during this start-up phase by a valve coupled with or controlled by the automatic choke. The throttle valve, linked with the vehicular accelerator pedal in the case of an automotive engine, is generally not more than partly open in the cold-starting period; with the flap valve also in a flow-restricting position, the gasoline-enriched air/fuel mixture is only slightly preheated and may therefore contain a considerable amount of hydrocarbon droplets which are partly intercepted by the front surface of the body or bodies constituting the throttle valve. To promote the evaporation of these droplets, I further propose to coat this front surface with an adsorbent layer of metal gauze, wicking or the like serving to retain these droplets until they are vaporized by the associated heating means. A similar combination of heating means and adsorbent layer is advantageously provided on a stationary plate opposite the manifold entrance which deflects the oncoming flow of air/fuel mixture and intercepts droplets—including those entrained by the diesel-oil vapors injected downstream of the throttle valve—able to reach the intake manifold.

The several heaters referred to are preferably of the dual type, i.e. electric and fluidic, with a switchover from electric heating to fluidic heating at the end of the start-up phase substantially concurrently with the movement of the flap valve to its wide-open position. The heating fluid may be constituted by a part of the exhaust gases although, in principle, water heated by the engine (such as that circulating through an automobile radiator) could also be used after the necessary warmup period.

A further feature of my invention relates to the provision of means for preventing the accumulation of residual liquid oil in the boiling chamber. This can be accomplished by the provision of a recirculation duct extending from the bottom of the chamber to one or more elevated lateral inlets thereof, the duct including a pump which is driven by a stream of exhaust gases. A different solution of this problem resides, according to yet another feature of my invention, in rotatably journaling the substantially cylindrical boiling chamber in an extension of the exhaust manifold and providing that chamber with drive means for continuously turning it about its axis; the drive means may comprise a set of vanes positioned for impulsion by the combustion gases discharged from the engine cylinders.

The temperature of the boiling chamber should be at least 100° C. above the boiling point of the fuel to be vaporized, which generally may range from about 125° C. to well above 200° C. The actual temperature of the fuel vapors preferably ranges between about 500° and 700° C., yet their mixture with the filtered air (even though the latter is preheated) will naturally be somewhat cooler. Various means, more fully described hereinafter, may be used for stabilizing the boiling-chamber temperature and preventing overheating.

BRIEF DESCRIPTION OF THE DRAWING

The above and other features of my invention will now be described in detail with reference to the accompanying drawing in which:

FIG. 1 is a somewhat diagrammatic perspective view, partly in section, of a four-cylinder automobile engine embodying my invention;

FIG. 2 is an axial sectional view of an exhaust manifold with a boiling chamber included in the engine of FIG. 1;

FIG. 3 is a cross-sectional view taken on the line III—III of FIG. 2;

FIG. 5 is a top view, with parts broken away, of a flap valve disposed in the carburetor inlet;

SPECIFIC DESCRIPTION

Figure 6:
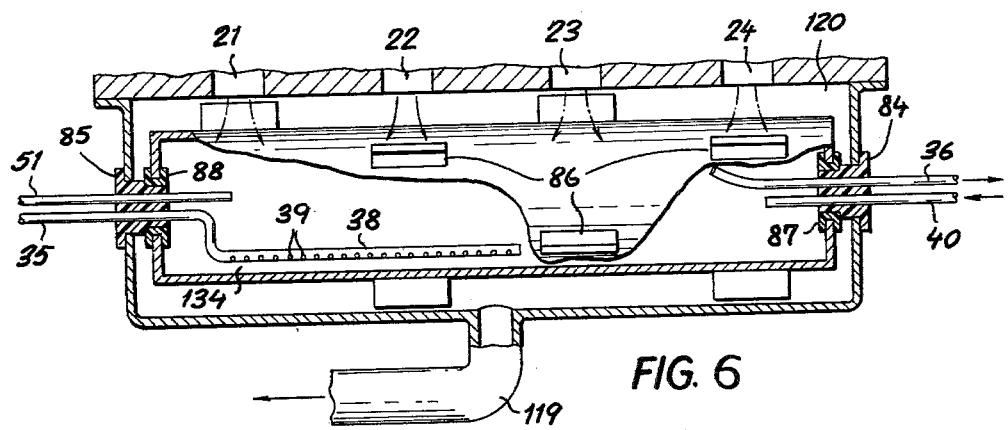
FIG. 6 is a view similar to FIG. 2, showing a modified boiling chamber.

In FIG. 1 I have shown an internal-combustion engine 10 for an automotive vehicle having four cylinders with respective inlet ports 11, 12, 13, 14 and outlet ports 21, 22, 23, 24 (FIG. 2), a fuel tank 15 filled with gasoline, a carburetor 16 delivering an explosive air/fuel mixture to an intake manifold 17 communicating with ports 11–14, an ancillary fuel tank 18 filled with diesel oil, and an exhaust pipe 19 extending from a manifold 20 which receives the combustion gases discharged via ports 21–24.

Carburetor 16 has a head 25 equipped with an annular filter 26 through which ambient air is aspirated in the usual manner by the suction intermittently created at ports 11–14 when the engine is operating. The aspirated air passes into intake manifold 17 by way of a mixing chamber 27 into which fuel from tank 15 is drawn by the suction via a conduit 28 terminating at an upstream location of the carburetor in a set of apertures 29. A flap valve 30 forms part of an automatic choke which, pursuant to conventional practice, restricts the inflow of air into the mixing chamber 27 in a start-up phase to enrich the air/fuel mixture, this valve moving into a wide-open position under the control of a nonillustrated temperature sensor as soon as the engine begins to heat up. Thereafter, the air flow is controlled by a throttle valve, here comprising two ganged valve bodies 31, 32, linked with the accelerator pedal (not shown) of the vehicle. The engine, of course, is also provided with the usual electrical starter motor which has likewise not been illustrated.

The lower part of the body of engine 10, forming the exhaust manifold 20, is traversed by a conduit for the aspiration of diesel oil from tank 18 to a carburetor compartment 33 below throttle valve 31, 32, this compartment constituting an extension of mixing chamber 27. The conduit for the conveyance of diesel oil comprises a boiling chamber 34 (see FIGS. 2 and 3) substantially in the shape of a horizontal cylinder, a feeder pipe 35 extending from tank 18 into one end of that cylinder, and a suction pipe 36 extending from the opposite end of the cylinder to a port 37 which opens into the space 33 at a location downstream from the gasoline-admitting apertures 29. Feeder pipe 35 terminates within chamber 34 in a horizontal tube 38 with a closed end and a multiplicity of perforations 39 close to the chamber bottom; a venting pipe 40 connects the carburetor inlet with the interior of chamber 34 for the admission of filtered ambient air into same. Pipe 40 enters the chamber 34 from the same end as pipe 36, the latter having a curved extremity 36' which projects beyond pipe 40 and curves radially away from the latter (upwardly in the illustrated embodiment) in order to make the exerted suction more effective within the chamber. I have found that the atmosphere in the boiling chamber is set in swirling motion about the chamber axis if the inlet end of pipe extremity 36' lies skew to that axis as shown; the resulting turbulence leads to a more intense vaporization and minimizes the accumulation of liquid hydrocarbon in a pool at the bottom of the chamber. Such a pool, however, will tend to form when the engine is stopped and begins to cool off; upon resumption of operation, a pump 41 with an impeller 42 in the path of the exiting exhaust gases recirculates the accumulated liquid via a pair of side ducts 43, 44 through lateral openings 45 in the chamber wall, the liquid being quickly evaporated as it trickles down along the inner wall surface.

The boiling chamber 34 of FIGS. 2 and 3 is fixedly mounted on the underside of a partition 46 having ports equipped with respective valves 47, 48 which may be thermostatically controlled by a heat sensor 49 in contact with the chamber wall to let a variable portion of the exhaust gases bypass the chamber 34 so as to prevent its temperature from rising too high above the boiling point of the diesel oil.

A buffer tank 50 communicates with the interior of boiling chamber 34 by way of a pipe 51 provided with a pressure-relief valve 52. Feeder pipe 35 has a driver-operated control valve 53 for selectively varying the oil/gasoline ratio. Suction pipe 36 and venting pipe 40 are provided with respective solenoid valves 54 and 55 which are closed on standstill, i.e. with the ignition turned off, and are opened at the end of the start-up phase under the control of a switching circuit 56 (FIG. 5) concurrently with the deactivation of the automatic choke, i.e. with the displacement of flap valve 30 to its wide-open position. The buildup of vapor pressure in chamber 34, e.g. upon a stopping of the engine, is limited by the spring-loaded relief valve 52 which lets excess fuel enter and condense in buffer tank 50 from which the condensate is withdrawn upon a reversal of the pressure differential across that valve.

FIG. 1 also shows a further conduit 57 which communicates with space 33 via a port 58 opposite port 37 and connects that space with the carburetor inlet for the admission of supplemental filtered air. Conduit 57 is provided with a manually adjustable needle valve 59.

Figure 4:
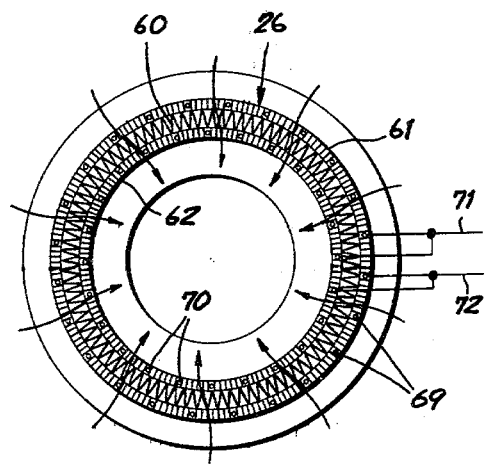
FIG. 4 shows, in a sectional detail view taken on the line IV—IV of FIG. 1, an air filter in the inlet of a carburetor associated with the engine.

Air filter 26, shown more clearly in FIG. 4, comprises two concentric rings 61, 62 formed from a network of hollow ribs and fins, similar to those of an automobile radiator, that are traversed during normal operation by a heating fluid such as exhaust gases entering via tubes 63, 64 and leaving by way of tubes 65, 66. A pleated layer 60 of filter paper or cloth is sandwiched between these rings. Electric heaters 69 and 70 traversing these rings are energized from the car battery, under the control of the switching circuit 56 shown in FIG. 5, by way of leads 71, 72. Other leads 73, 74 extend to a resistance heater 75 in flap valve 30 which is further provided with channels 76 for the passage of heating fluid (e.g. exhaust gases) axially admitted through a hollow shaft 77 and discharged through another hollow shaft 78, the fluid flow being controlled by circuit 56 through a solenoid valve 79. Similar electrical and fluidic heating means are provided in the two sections 31, 32 of the throttle valve (which could be replaced by a single valve body of the butterfly type) and in a stationary deflector plate 80 spacedly overlying the middle ports 12 and 13 opposite the junction of carburetor 16 with intake manifold 17. In all these instances, the changeover from electric to fluidic heating takes place under the control of circuit 56 jointly with the unblocking of the carburetor inlet by the automatic-choke control 30' which actuates the flap valve 30.

The purpose of plate 80 is to help distribute the oncoming air/fuel mixture inside the manifold 17 so as not to starve the outlying ports 11 and 14. At the same time, an adsorbent layer 83 of metal gauze or the like on plate 80 intercepts whatever droplets of nonevaporated fuel exit from the carburetor space 33; valve bodies 31 and 32 carry similar adsorbent layers 81 and 82.

Whereas the boiling chamber 34 of FIGS. 2 and 3 is stationary with reference to the engine body, I have shown in FIG. 6 another boiling chamber 134 of cylindrical shape which is journaled at its ends in a pair of fixed trunnions 84, 85 penetrating the sidewalls of a modified exhaust manifold 120. Feeder pipe 35, suction pipe 36, venting pipe 40 and pressure-equalizing pipe 51 pass in a fluidtight manner through these trunnions into the interior of the boiling chamber. The latter is externally provided with a set of peripherally staggered vanes 86 in line with the outlet ports 21-24 of the several combustion cylinders; the exhaust gases periodically issuing from these ports impinge upon the vanes 86 before exiting at a bottom outlet 119 so as to set the boiling chamber in rotation about its horizontal axis whereby any liquid oil accumulated on standstill at the bottom of the chamber is distributed over its entire wall surface for rapid vaporization. Trunnions 84, 85 coact with collars 87, 88 of low-friction material, e.g. Teflon, to form a pair of sealed bearings preventing the escape of fuel into the exhaust.

Figure 7:
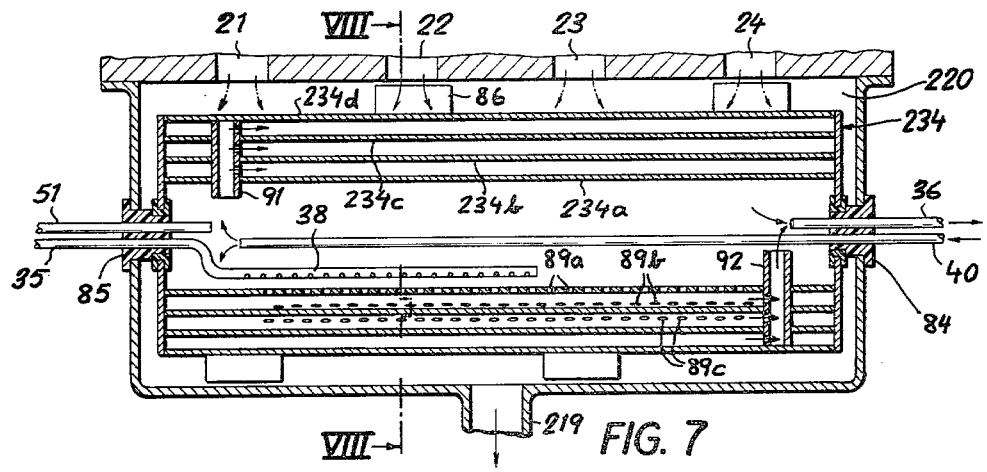
FIG. 7 is a view similar to FIG. 6 illustrating a further modification.
Figure 8:
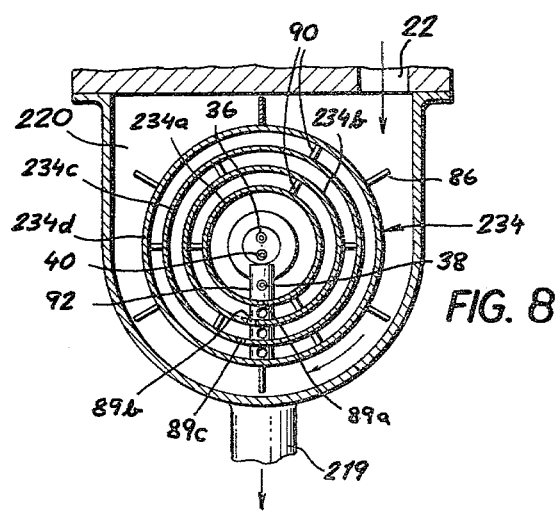
FIG. 8 is a cross-sectional view taken on the line VIII—VIII of FIG. 7.

FIGS. 7 and 8 show a rotatable boiling chamber 234 which differs from the chamber 134 of FIG. 6 by being subdivided into four coaxial cylindrical shells 234a, 234b, 234c, 234d forming three annular compartments between them. Inner shells 234a, 234b, 234c are provided with relatively staggered apertures 89a, 89b, 89c which are peripherally offset by a few degrees in the direction of rotation and allow accumulated liquid to pass from the interior of the chamber into the first compartment via apertures 89a for distribution over the inner wall of shell 234b, any further residue passing after nearly a full revolution through apertures 89b into the intermediate compartment to coat the inner surface of shell 234c. If there is still any liquid left, it passes after a further nearly full turn through apertures 89c into the outermost compartment to come into contact with shell 234d which is directly exposed to the gases in an exhaust manifold 220 and is therefore at the highest temperature, these gases exiting through an outlet 219. Shells 234a, 234b and 234c, supported from shell 234d via stays 90, are penetrated by two radially extending tubes 91, 92 which open into the intervening compartments near opposite ends of the chamber to facilitate the circulation of air therethrough, venting tube 40 having been extended in this instance to terminate in the vicinity of tube 91. The heat gradient thus established between the interior of the chamber and its outer wall limits the average temperature of the generated vapors while still ensuring complete vaporization of the fuel drawn from tank 18 even if that fuel is a mixture of different hydrocarbon fractions.

Figure 9:
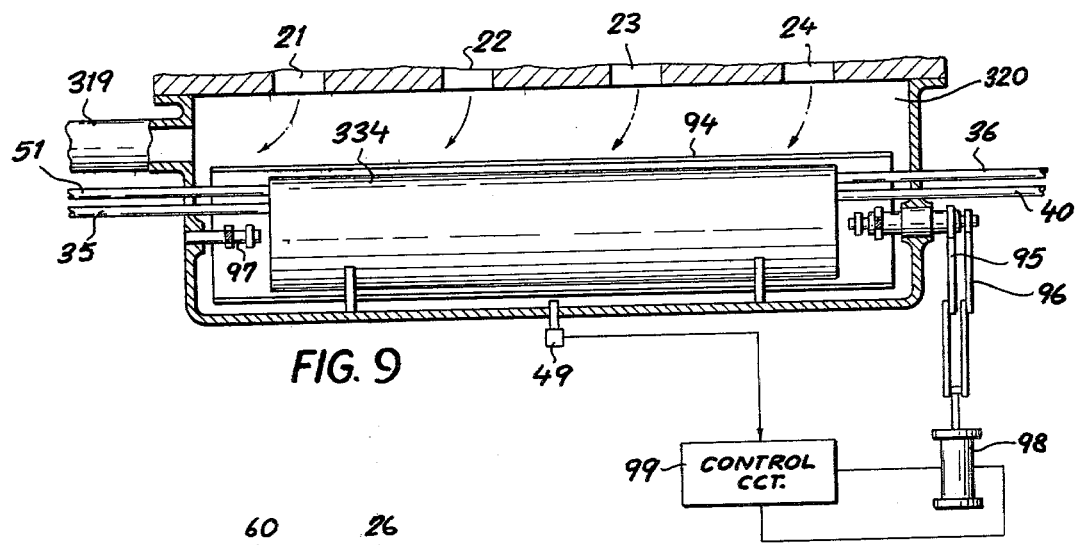
FIG. 9 is a further view similar to FIG. 2, showing an additional detail.
Figure 10:
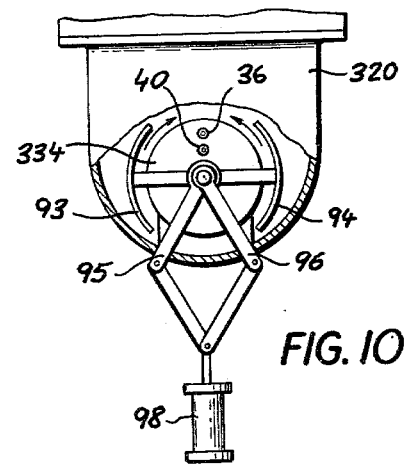
FIG. 10 is an end view, with parts broken away, of the exhaust manifold and boiler chamber shown in FIG. 9.

In FIGS. 9 and 10 I have shown another modified exhaust manifold 320 in which a stationary boiling chamber 334 is disposed just beyond an outlet 319 leading to exhaust pipe 19. Chamber 334, connected to pipes 35, 36, 40 and 51 substantially as shown for the chamber 34 of FIGS. 2 and 3, is provided with a temperature stabilizer in the form of an adjustable external heat shield comprising two movable covers 93, 94 supported by a pair of crank arms 95, 96 which are constituted in part by two nested shafts journaled in the right-end wall of manifold 320 as viewed in FIG. 9. At the opposite end of the manifold, the covers are supported by a fixed pivot stud 97. Arms 95 and 96 are anchored to the core of a solenoid 98 which is operated by a control circuit 99 in response to signals from a temperature sensor 49 similar to the one shown in FIG. 2. Thus, the two covers approach each other to a greater or lesser extent, dependent upon the temperature of chamber 334, to prevent overheating of the chamber by the exhaust gases from ports 21-24 while ensuring the complete vaporization of the diesel oil within the chamber. The latter may again be provided with a recirculation pump 41, as shown in FIGS. 2 and 3, driven by the exhaust gases or by other means.

Figure 11:
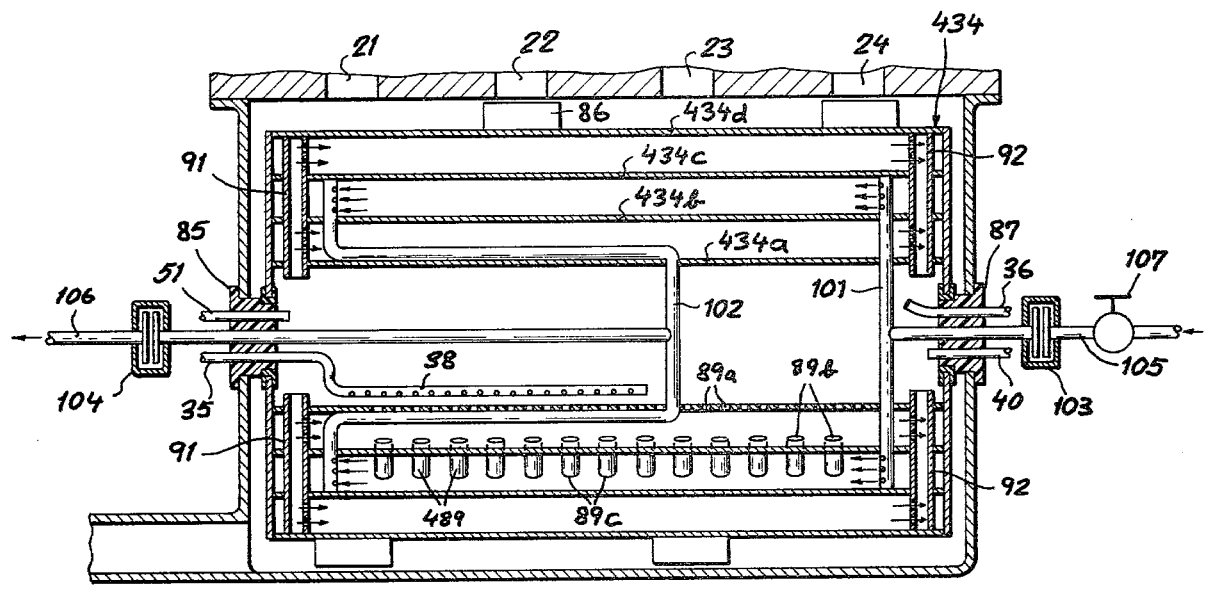
FIG. 11, in a view similar to FIG. 7, shows yet another modification.

A multiwall boiling chamber of the type illustrated in FIGS. 7 and 8 can also be used, according to a further advantageous feature of my invention, for controlling the chamber temperature with the aid of a cooling fluid (e.g. water) circulated continuously or intermittently through one of its annular compartments. Thus, as shown in FIG. 11, a rotary boiling chamber 434 similar to cylinder 234 again has four concentric shells 434a, 434b, 434c, 434d forming three such compartments, yet the radically extending tubes 91, 92 communicate only with the inner and outer compartments while being sealed against the middle one. This middle compartment is open toward an inlet tube 101 and an outlet tube 102, rotating with chamber 434, which are connected by rotary joints 103, 104 with stationary pipes 105, 106 in a branch of the vehicular water-circulation system. A valve 107 in pipe 105, which may be manually or thermostatically operated, controls the flow of water through that compartment.

The innermost shell 434a is again provided with a row of apertures 89a for the passage of liquid fuel, accumulating in a pool at the bottom of the rotating chamber, into the adjoining compartment. Apertures 89b and 89c in shells 434b and 434c, offset in the direction of rotation from apertures 89a but aligned with each other, are interconnected by sleeves 489 that are closed against the middle compartment to keep the fuel separated from the coolant. The system of FIG. 11 is particularly adapted for use with hydrocarbon mixtures including a low-boiling fraction vaporizable in the interior of the chamber and a high-boiling fraction trickling into the outermost compartment for evaporation therein.

Tests performed by me on various commercially manufactured passenger cars have established the increased efficiency of a vehicle powered by a mixture of gasoline and diesel oil, especially in a volumetric ratio ranging between 1:10 and 1:2, in comparison with operation by gasoline only. Thus, a car consuming 18.5 liters of gasoline for a drive of 100 kilometers traveled the same road with a mixture of 10 liters of gasoline and 2 liters of diesel oil, which corresponds to a saving of approximately 35%. A car having a range of 12 miles per gallon (or about 5 km per liter) of gasoline in city traffic, with an average speed of 30 to 35 miles or about 50 to 58 km per hour, was driven under similar conditions a distance of about 19 miles or 30 km with the addition of 1 liter of diesel oil to one gallon (or about four liters) of gasoline. On the open road, driving at 50 to 55 miles or 80 to 88 km per hour, I was able to cover distances of about 22 to 25 miles or 35 to 40 km with the same mixture.

The importance of preheating the combustion-air/fuel mixture was established by idling tests carried out with a blend of 0.5 liter of gasoline and 0.5 liter of diesel oil drawn from a common tank. Without preheating, the engine ran for 16 minutes and wasted considerable fuel in the exhaust. With a simplified version of the system of FIG. 1, comprising means for heating the air filter 61 and the throttle valve 31, 32, the same mixture yielded a running time of 32 minutes and smokeless exhaust gases free from uncombusted fuel as the heavier constituents were vaporized by the valve bodies whose temperature was above 150° C. A further idling test under like conditions, using 1 liter of gasoline without diesel oil, extended the running time from 16 minutes to 23 minutes when the fuel was preheated as described above.

With a mixture of 1 liter of gasoline and 1 liter of diesel oil, and with a vaporization temperature above 400° C. at the throttle valve, the engine ran for 56 minutes. An enrichment of the mixture with 0.25 liter of additional diesel oil, even with the running temperature lowered to 250° C., gave a running time of 1 hour and 14 minutes. A further enrichment resulting in a mixture of 1 liter of gasoline and 1.5 liters of diesel oil, accompanied by a raising of the vaporization temperature to 330° C., lengthened the running time by only 8 minutes. The exhaust gases were clean in all these tests.

The beneficial effects of preheating to temperatures of about 150° C. or higher also manifest themselves, as I have found, when the liquid fuel is replaced by bottled gaseous hydrocarbons (e.g. natural gas) admitted to the carburetor for admixture with aspirated air. Moreover, a sparkplug-equipped engine according to my invention could also be run on diesel oil alone.

I claim:

1. In an internal-combustion engine comprising a set of combustion cylinders provided with an intake manifold for the aspiration of an air/fuel mixture and an exhaust manifold for the discharge of hot combustion gases, a carburetor forming a mixing chamber which opens into an entrance of said intake manifold, a throttle valve in said carburetor separating said mixing chamber from said entrance, and storage means for holding a supply of liquid fuel to be aspirated in vaporized form into said mixing chamber for admixture with an air stream drawn into said intake manifold, the improvement wherein said storage means comprises a main fuel tank to be filled with a relatively light hydrocarbon and an ancillary fuel tank to be filled with a relatively heavy hydrocarbon, said main fuel tank being provided with first conduit means opening into said mixing chamber upstream of said entrance, said ancillary fuel tank being provided with second conduit means opening at a location downstream of said throttle valve into a space of said carburetor separating said mixing chamber from said entrance, said second conduit means including a boiling chamber positioned in heat-exchanging relationship with the combustion gases passing through said exhaust manifold.

2. The improvement defined in claim 1 wherein said mixing chamber has an air inlet including a filter for aspirated ambient air, said filter being provided with heating means.

3. The improvement defined in claim 2, further comprising automatic choke means including a flap valve disposed between said filter and said mixing chamber, said flap valve and said throttle valve being provided with additional heating means.

4. The improvement defined in claim 3 wherein said intake manifold is provided with a stationary plate opposite said entrance for intercepting and deflecting the oncoming flow of air/fuel mixture, said plate being provided with further heating means.

5. The improvement defined in claim 4 wherein said plate is provided with an adsorbent layer for promoting the vaporization of residual hydrocarbon droplets entrained by said air/fuel mixture.

6. The improvement defined in claim 3, 4 or 5 wherein all said heating means include battery-operated electric heaters and channels for the circulation of fluids heated by the engine, further comprising switchover means coupled with said automatic choke means for changing from electric heating to fluidic heating substantially concurrently with a movement of said flap valve from a flow-restricting position to a wide-open position at the end of a starting phase.

7. The improvement defined in claim 3, 4 or 5 wherein said throttle valve is provided with an adsorbent layer for promoting the vaporization of residual hydrocarbon droplets entrained by the aspirated air.

8. The improvement defined in claim 1 wherein said boiling chamber is provided with a bottom drain for liquid residue and with duct means for recirculating said residue from said drain to an elevated lateral inlet of said boiling chamber, said duct means including a pump driven by said combustion gases during operation of the engine.

9. The improvement defined in claim 1 wherein said boiling chamber is substantially cylindrical and rotatably journaled in an extension of said exhaust manifold and is provided with drive means for continuous rotation about the axis thereof during operation of the engine.

10. The improvement defined in claim 9 wherein said boiling chamber comprises a plurality of coaxial shells of heat-conducting material forming at least one annular compartment communicating with the interior of the boiling chamber for receiving unevaporated hydrocarbon and exposing same to more intense heating by the surrounding combustion gases.

11. The improvement defined in claim 9 or 10 wherein said drive means comprises a set of vanes on said boiling chamber positioned for impulsion by the discharged combustion gases.

12. The improvement defined in claim 8, 9 or 10 wherein said second conduit means comprises a supply pipe extending from said ancillary fuel tank into one end of said boiling chamber, an exhaust pipe extending from the opposite end of said boiling chamber to said carburetor, and a venting pipe connecting said boiling chamber with the surrounding atmosphere.

13. The improvement defined in claim 12 wherein said venting pipe extends to an inlet of said mixing chamber separated from the ambient atmosphere by an air filter provided with heating means.

14. The improvement defined in claim 12 wherein said venting pipe enters said boiling chamber at said opposite end, said exhaust pipe having an extremity projecting within said boiling chamber beyond said venting pipe and deviating therefrom to promote vortex generation.

15. The improvement defined in claim 12 wherein said boiling chamber is further provided with an additional pipe communicating with a buffer chamber through a pressure-relief valve allowing excess heavy hydrocarbon to pass in vaporized form from said boiling chamber to said buffer chamber and letting condensed heavy hydrocarbon return from said buffer chamber to said boiling chamber.

16. The improvement defined in claim 3, 4 or 5 wherein said second conduit means includes valve means coupled with said automatic choke means for blocking the flow of said heavy hydrocarbon from said ancillary fuel tank to said downstream location in a flow-restricting starting position of said flap valve.

17. The improvement defined in claim 1 wherein said boiling chamber is provided with temperature-stabilizing means.

18. The improvement defined in claim 17 wherein said temperature-stabilizing means comprises thermostatically controlled shield means interposable between said exhaust manifold and said boiling chamber.

19. The improvement defined in claim 17 wherein said temperature-stabilizing means comprises a bypass for said combustion gases provided with thermostatically controlled valve means.

20. The improvement defined in claim 17 wherein said temperature-stabilizing means comprises a peripheral jacket surrounding said boiling chamber and thermostatically controlled valve means for directing a flow of cooling fluid through said jacket.

21. The improvement defined in claim 2, 3, 4 or 5, further comprising an additional conduit linking said air inlet with said space.

* * * * *